2,913,307
METHOD OF PREPARING PLUTONIUM TETRAFLUORIDE

Ray L. Beede, Ballston Lake, N.Y., and Horace H. Hopkins, Jr., Richland, Wash., assignors to the United States of America as represented by the United States Atomic Energy Commission No Drawing. Application December 12, 1957
Serial No. 702,492

7 Claims. (Cl. 23—14.5)

This invention deals with a process of preparing plutonium tetrafluoride.

Plutonium tetrafluoride has been made heretofore by reacting plutonium dioxide with gaseous hydrogen fluoride. This process involved quite some corrosion problems on account of the elevated temperature that had to be used. The tetrafluoride has also been produced by reacting an aqueous solution of a plutonium salt with aqueous hydrofluoric acid; however, the precipitated fluoride obtained thereby was amorphous, hard to filter and to wash, so that adhering impurities could not be removed therefrom readily.

It is an object of this invention to provide a process for preparing plutonium tetrafluoride by precipitation in an aqueous solution whereby a crystalline fluoride is obtained which is easy to filter and easy to wash.

It is another object of this invention to provide a process for preparing plutonium tetrafluoride by precipitation in an aqueous solution wherein a long digestion period for complete precipitation is not necessary and the fluoride can be filtered in a relatively short time.

It is also an object of this invention to provide a process for preparing plutonium tetrafluoride by precipitation in aqueous solution whereby the resulting tetrafluoride can be dried under somewhat less severely corrosive conditions than are encountered in reacting plutonium dioxide with hydrogen fluoride.

It is also an object of this invention to provide a process for preparing plutonium tetrafluoride by precipitation in an aqueous solution which furnishes a fluoride of a high degree of purity.

It has been found that if the precipitation of a plutonium salt from an aqueous solution is carried out, instead of with hydrogen fluoride or an aqueous solution thereof, with fluosilicic acid anions, a slow reaction takes place and precipitation occurs as the fluosilicic acid hydrolyzes and forms hydrogen fluoride. As the hydrogen fluoride then reacts with the plutonium salt, a new amount of hydrogen fluoride is released from the fluosilicic acid by hydrolysis. Thus a slow reaction is guaranteed by the use of fluosilicis acid which accounts for the crystalline structure of the precipitate obtained thereby. It was also found, against all expectations, that during this precipitation with fluosilicic acid a separation from aluminum and iron ions, which often are present in the solution as contaminants, occurs; this simultaneous "decontamination" does not take place when hydrogen fluoride or an aqueous solution thereof is used as the precipitating agent.

The process of this invention thus broadly comprises adding to a mineral acid solution of a mineral acid Pu(IV) salt anions of fluosilicic acid, preferably at room temperature, whereby crystalline Pu(IV) fluoride precipitates and separating the precipitate from the solution. Mineral acids particularly well suitable are nitric acid and hydrochloric acid.

The plutonium salts have to be present in the aqueous solution as the salts of tetravalent plutonium. It was found that trivalent plutonium did not precipitate, not even after a digestion of four days at room temperature. The concentration of the mineral acid salt of plutonium may vary widely. In the case of plutonium nitrate, which is the preferred salt, a concentration of between 40 and 80 grams per liter of solution was found most satisfactory.

The fluosilicic acid anion can be added in the form of a water-soluble salt, in particular an alkali salt, such as the sodium, potassium or ammonium salt, or as the free acid; the latter is preferred. As has been mentioned above, the reaction is preferably carried out at room temperature which is a temperature of about 25° C.

It was found that the rate of precipitation of the fluoride is dependent on the acidity of the solution and that there is an upper limit in the case, for instance, of nitric acid of 1.6 N; this limit is critical because with higher acidities precipitation was found to be very slow. For example, one experiment was carried out with a solution containing 40 grams of Pu(IV) nitrate per liter and being 2.2 N in nitric acid. The addition of fluosilicic acid did not bring about a precipitation with 1½ hours, and only after 16 hours did the precipitation start. This is one of the experiments which shows that an acidity of above 1.6 N is not satisfactory.

It was found that some of the plutonium precipitated in the form of the fluosilicate. This drawback was overcome by adding to the solution an excess amount of hydrofluoric acid after the precipitation with fluosilicic acid anions had been completed; by this the plutonium fluosilicate was converted to the plutonium tetrafluoride, and at the same time precipitated silica which had been formed by hydrolysis of fluosilicic acid was converted to soluble fluosilicic acid. In order to accomplish both, the hydrofluoric acid should be added in a quantity of at least four moles per one mole of plutonium, but an excess of between 0.01 and 0.1 M is preferred.

The precipitate can be separated from the supernatant by customary means, such as centrifugation, decantation or filtration. A filter having a pore size of from 10 to 15 microns was preferably used. The filter cake obtained was then washed with hydrofluoric acid having a concentration of between about 0.5 and 1.0 M and then with nitric acid of from about 0.5 to 2 M. If the plutonium tetrafluoride is to be used for the production of plutonium metal, for instance by the so-called bomb process, which is by reduction with an alkaline earth metal in an autoclave, it is first dried at about 350 to 500° C. in an atmosphere of anhydrous hydrogen fluoride. The reduction of plutonium fluoride is disclosed in the copending application Serial No. 637,485 filed by Glenn T. Seaborg on December 27, 1945, on pages 88–90.

In the following an example is given which illustrates the process of this invention. It is not intended to have the scope of the invention limited to the details given in this example.

Example

To a solution containing 40 grams of plutonium nitrate, Pu(NO$_3$)$_4$, per liter and nitric acid in a concentration of 1.2 M there was added a 31% fluosilicic acid solution in a quantity of one mole of the acid per one mole of plutonium. The solution was agitated. After about 20 minutes a precipitate formed, and precipitation was found to be complete after 40 minutes. Thereafter a 48% aqueous solution of hydrogen fluoride was added in a quantity of slightly more than four moles per one mole of plutonium. The precipitate was crystalline, settled fast and could be filtered off immediately without any further digestion.

The separated filter cake was washed, first with an 0.5 M solution of hydrogen fluoride and then with a 2

M nitric acid. A sample of the washed cake was analyzed by X-ray diffraction and found to correspond to a compound of the formula $PuF_4 \cdot 2.5H_2O$; there was no evidence of a fluosilicate structure. Chemical analyses of a sample of the cake showed that it had an F:Pu ratio of 4. The density of the cake was 0.4 gram per cc. The yield was 100%.

The washed cake was then dried in anhydrous hydrogen fluoride at 350° C. for one hour. It was analyzed again by spectrochemical methods. The results of this analysis are compiled in the table below.

| Element | Feed, p.p.m. of Pu | Fluoride, p.p.m. of Pu |
|---|---|---|
| Al | 8,000 | <130 |
| Ca | 320 | 10 |
| Cr | 4,000 | 50 |
| Fe | >20,000 | 200 |
| Mg | 1,000 | 10 |
| Mn | 2,000 | 5 |
| Ni | 2,000 | 200 |
| Si | 1,000 | 2 |

It will be obvious from this table that a high degree of decontamination had been accomplished by the precipitation step.

The plutonium tetrafluoride was then reduced to the metal in an autoclave using calcium as the reducing agent and iodine as a booster. This phase of the process, however, is not part of the invention. The plutonium metal obtained thereby contained the contaminants, all expressed in parts per million of plutonium, as follows: 130 p.p.m. aluminum, 25 p.p.m calcium, 200 p.p.m. chromium, 50 p.p.m. iron, 100 p.p.m. magnesium, 50 p.p.m. manganese, 50 p.p.m. nickel and 5 p.p.m. silicon.

It will be understood that this invention is susceptible to various modifications and changes which fall within the scope of the appended claims.

What is claimed is:

1. A process of preparing plutonium tetrafluoride from aqueous mineral acid solutions of a Pu(IV) mineral acid salt having a maximum acidity of 1.6 N, comprising adding a fluosilicic-anion-containing compound selected from the group consisting of hydrogen, ammonium, sodium and potassium fluosilicates to said solution at room temperature whereby plutonium tetrafluoride precipitates, and separating the precipitate from the solution.

2. The process of claim 1 wherein the plutonium salt is Pu(IV) nitrate and the mineral acid is nitric acid.

3. The process of claim 1 wherein the fluosilicic anions are added in the form of fluosilicic acid.

4. A process of preparing plutonium tetrafluoride from aqueous mineral acid solutions of a Pu(IV) mineral acid salt having a maximum acidity of 1.6 N comprising adding a fluosilicic-anion-containing compound selected from the group consisting of hydrogen, ammonium, sodium and potassium fluosilicates to said solution at room temperature whereby plutonium tetrafluoride and some plutonium silicofluoride precipitate, adding at least 4 moles of hydrofluoric acid per mole of plutonium whereby precipitated plutonium silicofluoride is converted to plutonium tetrafluoride and precipitated silica is converted to water-soluble fluosilicic acid, and separating the precipitate from the solution.

5. The process of claim 4 wherein an excess of from 0.01 to 0.1 M of hydrofluoric acid is used.

6. The process of claim 1 wherein the separated precipitate is washed, first with dilute hydrofluoric acid and then with dilute nitric acid.

7. The process of claim 6 wherein the dilute hyrofluoric acid has a concentration of between 0.5 and 1 M and the dilute nitric acid a concentration of between 0.5 and 2 M.

References Cited in the file of this patent

Hackh: "Chemical Dictionary," 3rd edition, pages 349, 678, 787 (1950).